United States Patent
Blume et al.

(10) Patent No.: US 11,736,020 B2
(45) Date of Patent: Aug. 22, 2023

(54) POWER SUPPLY SYSTEM

(71) Applicant: B&R INDUSTRIAL AUTOMATION GMBH, Eggelsberg (AT)

(72) Inventors: Sebastian Blume, Eggelsberg (AT); Stefan Nesic, Eggelsberg (AT); Djordje Vukovic, Eggelsberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 85 days.

(21) Appl. No.: 17/365,265

(22) Filed: Jul. 1, 2021

(65) Prior Publication Data
US 2022/0006384 A1     Jan. 6, 2022

(30) Foreign Application Priority Data
Jul. 3, 2020   (AT) ................ A 50569/2020

(51) Int. Cl.
H02M 3/28     (2006.01)
H02P 27/06    (2006.01)

(52) U.S. Cl.
CPC .............. H02M 3/28 (2013.01); H02P 27/06 (2013.01)

(58) Field of Classification Search
CPC .................................. H02M 3/28; H02P 27/06
See application file for complete search history.

(56) References Cited

U.S. PATENT DOCUMENTS

| 9,377,774 | B2 | 6/2016 | Tajima | |
| 2009/0040800 | A1* | 2/2009 | Sonnaillon | H02M 7/1626 363/127 |
| 2020/0266652 | A1* | 8/2020 | Wilhide | B60L 58/18 |
| 2021/0006173 | A1* | 1/2021 | Hamachi | H02M 1/08 |
| 2022/0055468 | A1* | 2/2022 | Maruyama | H01M 50/20 |

FOREIGN PATENT DOCUMENTS

| CN | 206389297 | | 8/2017 |
| DE | 10 2014 012 126 | | 4/2015 |
| EP | 2 159 908 | | 3/2010 |
| EP | 2 980 944 | | 2/2016 |
| EP | 2980944 | * | 2/2016 |

OTHER PUBLICATIONS

EP- 2980944 has been attached.*
Austria Search Report conducted in counterpart Austria Appln. No. A 50569/2020 (dated May 27, 2021).

* cited by examiner

*Primary Examiner* — Zoheb S Imtiaz
(74) *Attorney, Agent, or Firm* — Greenblum & Bernstein, P.L.C.

(57) ABSTRACT

A more efficient power supply system comprises a rectifier, a low voltage inverter, and a low voltage actuator, the rectifier converting a mains AC voltage into a low input DC voltage, the low voltage inverter connected to the rectifier and converting the low input DC voltage into a low supply AC voltage, and the low voltage inverter connected to the low voltage actuator to supply the low voltage actuator with power via the low supply AC voltage. A DC-DC converter connected to the rectifier converts the low input DC voltage into an extra-low DC voltage. An extra-low voltage inverter connected to the DC-DC converter converts the extra-low DC voltage into an extra-low supply AC voltage. The extra-low voltage inverter connected to an extra-low voltage actuator supplies the extra-low voltage actuator with power via the extra-low supply AC voltage.

17 Claims, 3 Drawing Sheets

POWER SUPPLY SYSTEM

CROSS-REFERENCE TO RELATED APPLICATIONS

The present application claims the priority under 35 U.S.C. § 119(a) of Austria Patent Application No. A50569/2020 filed Jul. 3, 2020, the disclosure of which is expressly incorporated by reference herein in its entirety.

The present invention relates to a power supply system comprising a rectifier, a low voltage inverter and a low voltage actuator, the rectifier being designed to convert a mains AC voltage into a low input DC voltage, the low voltage inverter being connected to the rectifier and designed to convert the low DC voltage input into a low supply AC voltage, and the low voltage inverter being connected to the low voltage actuator in order to supply the low voltage actuator with power via the low supply AC voltage. Furthermore, the present invention relates to a method for supplying power to a low voltage actuator and an extra-low voltage actuator, a rectifier converting a mains AC voltage into a low input DC voltage and a low voltage inverter converting the low input DC voltage into a low supply AC voltage in order to supply the low voltage actuator with power via the low supply AC voltage.

Direct-current voltages (DC) and alternating-current voltages (AC) are commonly divided into different voltage ranges. Extra-low DC voltages are in the voltage range of from 0 to 120 V DC. 0 to 60 V DC can also be provided in accordance with DVC-A (Decisive Voltage Classification A); cf. standard EN 61800-5-1. Extra-low AC voltages are in the range of from 0 to 50 VAC. Low DC voltages, on the other hand, are in the range of from 120 to 1500 V DC, and low AC voltages in the range of from 50 to 1000 V AC. High DC voltages are in the range of over 1500 V DC, and high AC voltages in the range of over 1000 V AC.

The mains AC voltage of a power supply network is in the low voltage range, preferably 230 V AC, 400 V AC, or 480 V AC. Low voltage actuators, however, require low supply AC voltages of 500 to 800 V AC, depending on the design. A power supply system is therefore required in order to convert the mains AC voltage into a low supply AC voltage which is suitable for the low voltage actuators and which can be provided to the low voltage actuators. It is theoretically possible to connect every low voltage actuator directly to the power supply network via one or more low voltage transformers or direct converters. These low voltage transformers or direct converters thus convert the mains AC voltage of the power supply network for supplying the low voltage actuators directly into a low supply AC voltage, which of course is not economical. In order to create a more cost-effective topology, rectifiers are often provided in power supply systems for supplying low voltage actuators. The rectifier converts the mains AC voltage into a low input DC voltage. However, since the low voltage actuator requires a low supply AC voltage, a low voltage inverter is also provided which converts the low input DC voltage into a low supply AC voltage. The low supply AC voltage is in turn provided to the associated low voltage actuator. A low voltage inverter is usually assigned to each low voltage actuator, the low voltage inverters drawing the low input DC voltage from the same rectifier.

However, in long-stator linear motors, planar motors, and smaller rotary motors, etc., extra-low voltage actuators, which in turn require an extra-low supply AC voltage to operate, are often installed. Therefore, in known power supply systems, a further rectifier is often provided which converts the mains AC voltage into a low DC voltage which is provided to an extra-low voltage inverter. The extra-low voltage inverter converts the low DC voltage into a low supply AC voltage and provides it to the extra-low voltage actuator.

An aim of the present invention is to provide an alternative power supply system which allows actuators to be supplied with power with different supply voltages.

This aim is achieved according to the invention by providing a DC-DC converter which is connected to the rectifier and designed to convert the low input DC voltage into an extra-low DC voltage, an extra-low voltage inverter being provided which is connected to the DC-DC converter and designed to convert the extra-low DC voltage into an extra-low supply AC voltage, and the extra-low voltage inverter being connected to an extra-low voltage actuator in order to supply the extra-low voltage actuator with power via the extra-low supply AC voltage. The aim is also achieved with a method in which the low input DC voltage is converted into an extra-low DC voltage by a DC-DC converter, and in which an extra-low voltage inverter converts the extra-low DC voltage into an extra-low supply AC voltage in order to supply the extra-low voltage actuator with power via the extra-low supply AC voltage.

Therefore, the low voltage actuator is supplied with power from a mains AC voltage (for example provided by a power supply network) via the rectifier and the low voltage inverter, and an extra-low voltage actuator is supplied with power via the same rectifier, the DC-DC converter, and the extra-low voltage inverter. Since the DC-DC converter converts the low input DC voltage provided by the rectifier into the extra-low DC voltage, an additional rectifier which converts the mains AC voltage into an extra-low DC voltage is not required. The rectifier is preferably designed for converting a mains AC voltage of 220 to 480 VAC±10% into a low input DC voltage of 120 to 1500 V DC, preferably 250 to 900 V DC, particularly preferably 500 to 900 V DC. This means that the power supply system can be used in many power supply networks available worldwide (TT systems, TN-S systems, TN-C-S systems with three-phase mains AC voltages in the range of from 220 to 480 VAC±10%). Since the required level of the low input DC voltage and extra-low DC voltage is known in advance, a DC-DC converter with a small voltage range can be used. This also results in increased efficiency of the DC-DC converter.

The DC-DC converter is preferably connected to the low voltage inverter via a supply connection in order to supply the low voltage inverter with operating power using the extra-low DC voltage. The low voltage inverter, like the extra-low voltage inverter, needs a supply of operating power in order to guarantee a basic function, i.e. the supply of control units, switching units, etc. Since an extra-low DC voltage to be converted is already applied at the input side of the extra-low voltage inverter, this extra-low DC voltage is used to obtain the operating power of the extra-low voltage inverter and to ensure that said inverter functions. The low voltage inverter can thus also be supplied with operating power via the supply connection using the extra-low DC voltage.

The DC-DC converter can be an integral component of the rectifier or it can be designed as an independent unit. The DC-DC converter is preferably designed to be insulated and/or bidirectional.

Bidirectional DC-DC converters are known but have until now used to supply power to batteries, uninterruptible power supplies (UPSs), and battery electric vehicles (BEVs). When supplying batteries or uninterruptible power supplies, there is a low input DC voltage (fundamentally 500-1000 V DC) on an input side which is converted into an extra-low output DC voltage (24-48 V DC) on an output side.

Excess power at the extra-low voltage actuator is preferably fed to the low voltage actuator via the extra-low voltage inverter, the DC-DC converter, and via the low voltage inverter.

If the extra-low voltage inverter and the DC-DC converter are bidirectional, a power flow from the input side of the DC-DC converter (at which the low input DC voltage is applied) to the output side of the DC-DC converter (at which the extra-low DC voltage is applied) and a power flow from the output side to the input side are possible. This allows not only a power flow from the power supply network via the rectifier and the DC-DC converter and the extra-low voltage inverter to the extra-low voltage actuator, but also a power flow from the extra-low voltage actuator via the extra-low voltage inverter and the DC-DC converter, i.e. to the low input DC voltageand thus in turn via the low voltage inverter to the low voltage actuator. This allows power to be transferred from the extra-low voltage actuator to the low voltage actuator, which is why a bidirectional DC-DC converter increases the efficiency of the system, since extra-low voltage actuators, especially in long-stator linear motors and planar motors, often have a dynamic load profile. This means that there may be excess power at the extra-low voltage actuators which was generated by a braking process, for example.

Excess power at the extra-low voltage actuator is preferably fed back to the power supply network via the extra-low voltage inverter, the DC-DC converter, and via the rectifier. The excess power thus does not have to be destroyed and is not lost, which increases the efficiency of the power supply system. This feedback is possible in particular if the extra-low voltage inverter, the DC-DC converter, and the rectifier are bidirectional.

If the DC-DC converter is not bidirectional (i.e. is unidirectional), then excess power present at the extra-low voltage actuator can be destroyed at the extra-low voltage actuator. However, if a bidirectional extra-low voltage inverter is provided, the excess power can also be converted back to the extra-low intermediate voltage (both with a unidirectional and a bidirectional DC-DC converter) and provided to other extra-low voltage actuators via additional extra-low voltage inverters, or used as operating power, at least in part, if a supply connection is provided to supply the low voltage inverter with operating power.

Excess power at the low voltage actuator is preferably fed via the low voltage inverter, via the DC-DC converter, and via the extra-low voltage inverter to the extra-low voltage actuator and/or excess power at the low voltage actuator is fed via the low voltage inverter and via the rectifier to the power supply network.

If the low voltage inverter is bidirectional, power can be fed back from the low voltage actuator, it being possible for the power to be fed back to the power supply network via a bidirectional rectifier and/or for the power to be fed to the extra-low voltage actuator via the DC-DC converter and the extra-low voltage inverter.

The DC-DC converter preferably comprises an inverter unit for converting the low input DC voltage into a primary AC voltage, a transformer unit which is connected to the inverter unit in order to transform the primary AC voltage into a secondary AC voltage, and a rectifier unit which is connected to the transformer unit in order to convert the secondary AC voltage into the extra-low DC voltage.

In order to provide a bidirectional DC-DC converter and minimize the number of electronic components used, an embodiment as a dual active bridge is advantageous. The dual active bridge is preferably single-stage and is controlled using three-level modulation. A high voltage range can therefore be covered by the low input DC voltage, as a result of which the DC-DC converter can be connected to power supply networks with different mains AC voltages via suitable rectifiers. A DC-DC converter as a dual active bridge also ensures high dynamics. If the dual active bridge is symmetrical, i.e. the DC voltage-AC voltage bridge and AC voltage-DC voltage bridge are identical, the DC-DC converter provides power symmetry, which means that power can be fed in and fed back to the same extent. The power range of such a DC-DC converter is preferably 2 kW with a repetitive peak load capacity of 3 kW.

The low voltage actuator can be part of a kinematics system, a machine tool, or a rotary motor.

The extra-low voltage actuator can be part of a long-stator linear motor, a planar motor, or an extra-low voltage rotary motor.

A first plurality of extra-low voltage inverters with associated extra-low voltage actuators is preferably provided, the first plurality of extra-low voltage inverters being connected to the DC-DC converter in order to convert the extra-low DC voltage into respective extra-low supply AC voltages and supply the associated extra-low voltage actuators with the extra-low supply AC voltage. The extra-low DC voltage can thus serve as a central connection point for the first plurality of extra-low voltage inverters and the associated extra-low voltage actuators. The extra-low supply AC voltages of the respective extra-low voltage actuators can be identical or different.

A second plurality of low voltage inverters with associated low voltage actuators is preferably provided, the second plurality of low voltage inverters being connected to the rectifier in order to convert the low input DC voltage into respective low supply AC voltages and supply each associated low voltage actuator with the low supply AC voltage. The low input DC voltage can thus serve as a central connection point for the first plurality of low voltage inverters and the associated low voltage actuators. The low supply AC voltages of the respective low voltage actuators can be identical or different.

The present invention will be explained below in greater detail with reference to FIGS. 1 to 5, which show exemplary advantageous embodiments of the invention in a schematic and non-limiting manner. In the drawings.

Figure 1:
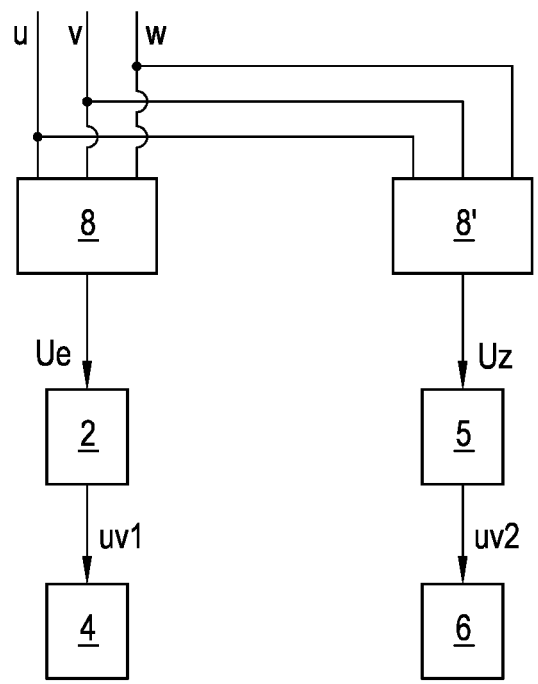
FIG. 1 shows a power supply system according to the prior art.

FIG. 1 shows a power supply system 1 according to the prior art. A low voltage actuator 4 is provided which is supplied with a low supply AC voltage uv1 (for example in the range of from 50 to 1000 V AC, preferably in the range of from 500 to 800 V AC). The low voltage actuator 4 can be part of e.g. a kinematics system, a machine tool, or a rotary motor, etc.

Furthermore, an extra-low voltage actuator 6 is provided which is supplied with an extra-low supply AC voltage uv2

(for example in the range of from 0 to 50 V AC). The extra-low voltage actuator 6 can be part of a long-stator linear motor, a planar motor, a rotary motor (each designed for an extra-low supply AC voltage uv2), etc.

In order to provide the low supply AC voltage uv1, a low voltage inverter 2 is provided which is connected to the low voltage actuator 4 and thus supplies the low voltage actuator 4 with the low supply AC voltage uv1. In order to provide the extra-low supply AC voltage uv2, an extra-low voltage inverter 5 is provided which is connected to the extra-low voltage actuator 6 and thus supplies the extra-low voltage actuator 6 with the extra-low supply AC voltage uv2.

Also provided is a rectifier 8 which is designed to convert a mains AC voltage u, v, w (in this case three-phase) into the low input DC voltage Ue (120 to 1500 V DC). The mains AC voltage u, v, w is preferably in the form of a low AC voltage (i.e. in the range of from 50 to 1000 V AC) and is provided, for example, by a power supply network.

The rectifier 8 is connected to the low voltage inverter 2 and supplies it with the low input DC voltage Ue. The low voltage inverter 2 converts the low input DC voltage Ue into the low supply AC voltage uv1, which is provided to the low voltage actuator 4.

The extra-low voltage inverter 5, however, requires an extra-low input DC voltage Uz in order to convert it into an extra-low supply AC voltage uv2 (0 to 50 V AC) and provide it to the extra-low voltage actuator 6. A further rectifier 8' is therefore provided which is designed to convert the mains AC voltage u, v, w into the extra-low DC voltage Uz (in the range of from 0 to 120 V DC, preferably from 24 to 60 V DC). The further rectifier 8' thus provides the extra-low voltage inverter with the extra-low DC voltage Uz. The extra-low voltage inverter 5 converts the extra-low input DC voltage Uz into the extra-low supply AC voltage uv2, which is provided to the extra-low voltage actuator 6.

In summary, in FIG. 1, the low voltage actuator 4 is supplied with power via the rectifier 8 and the low voltage inverter 2, whereas the extra-low voltage actuator 4 is supplied with power via the further rectifier 8' and the extra-low voltage inverter 2.

Figure 2:
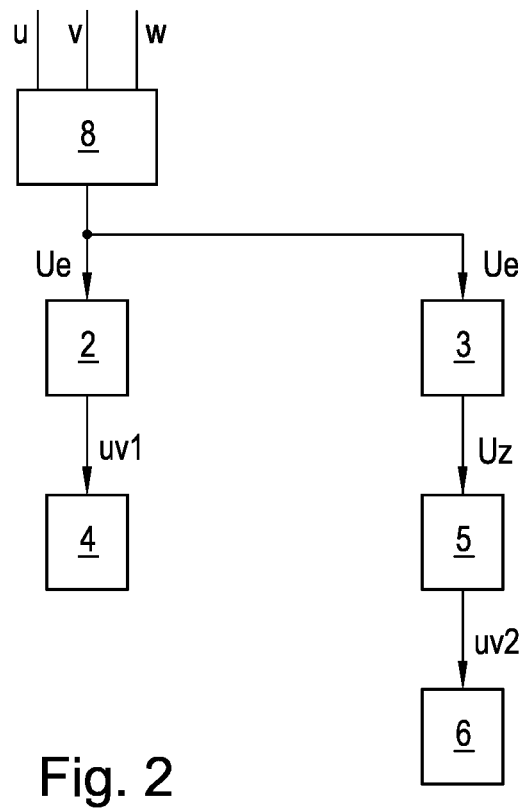
FIG. 2 shows a power supply system according to the invention.

FIG. 2, in contrast, shows a power supply system 1 according to the invention. As in FIG. 1, a rectifier 8 is provided which is designed to convert a mains AC voltage u, v, w into a low input DC voltage Ue (120 to 1500 V DC). Furthermore, as in FIG. 1, the low input DC voltage Ue is converted by a low voltage inverter 2 into a low supply AC voltage uv1 (in the range of from 50 to 1000 V AC, preferably in the range of from 560 to 800 V AC) and a low voltage actuator 4 is provided.

In contrast to FIG. 1, in FIG. 2, a DC-DC converter 3 which is connected to the rectifier 8 and to the extra-low voltage inverter 5 is provided according to the invention for supplying power to the extra-low voltage actuator 6. The DC-DC converter 3, which can be an integral component of the rectifier 8, is designed to convert the low input DC voltage Ue provided by the rectifier 8 into an extra-low DC voltage Uz (in the range of from 0 to 120 V DC, preferably 0 to 60 V DC). The extra-low DC voltage is provided to the extra-low voltage inverter 5 by the DC-DC converter 3. The extra-low voltage inverter 5 itself is in turn connected to the extra-low voltage actuator 6 and accordingly designed to convert the extra-low DC voltage Uz into an extra-low supply AC voltage uv2 (in the range of from 0 to 50 V AC) and provide it to the extra-low voltage actuator 6.

A further rectifier 8' for supplying power to the extra-low voltage inverter 5 can thus be dispensed with. Instead, the extra-low voltage actuator 6 is supplied with power via the already present rectifier 8, the DC-DC converter 3, and finally the extra-low voltage inverter 5.

Figure 3:
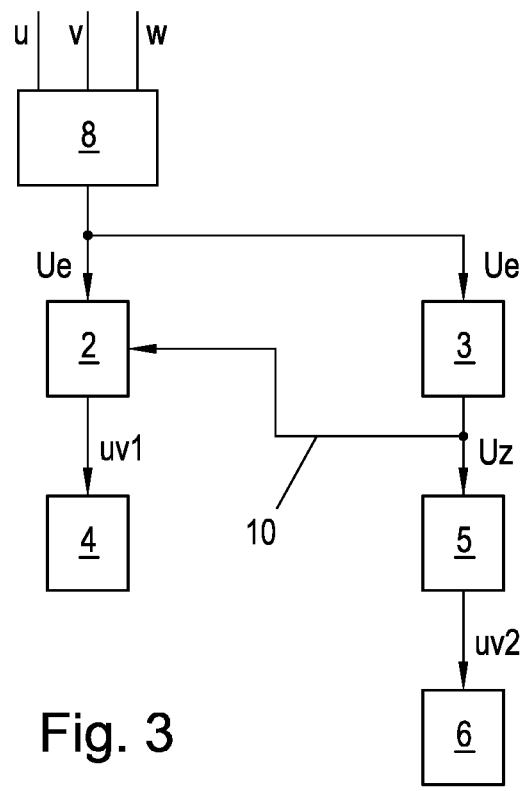
FIG. 3 shows a power supply system with a supply connection.

Each inverter requires operating power to function, i.e. to supply associated control units, switching units, etc. The extra-low voltage inverter 5 can use the extra-low DC voltage Uz already present on its input side and draw its operating power therefrom. The output side of the DC-DC converter 3 is preferably connected not only to the input side of the extra-low voltage inverter 2, but also via a supply connection 10 to the low voltage inverter 2, as shown in FIG. 3. Using the supply connection 10, the low voltage inverter 2 is supplied with operating power via the extra-low DC voltage Uz.

Figure 4:
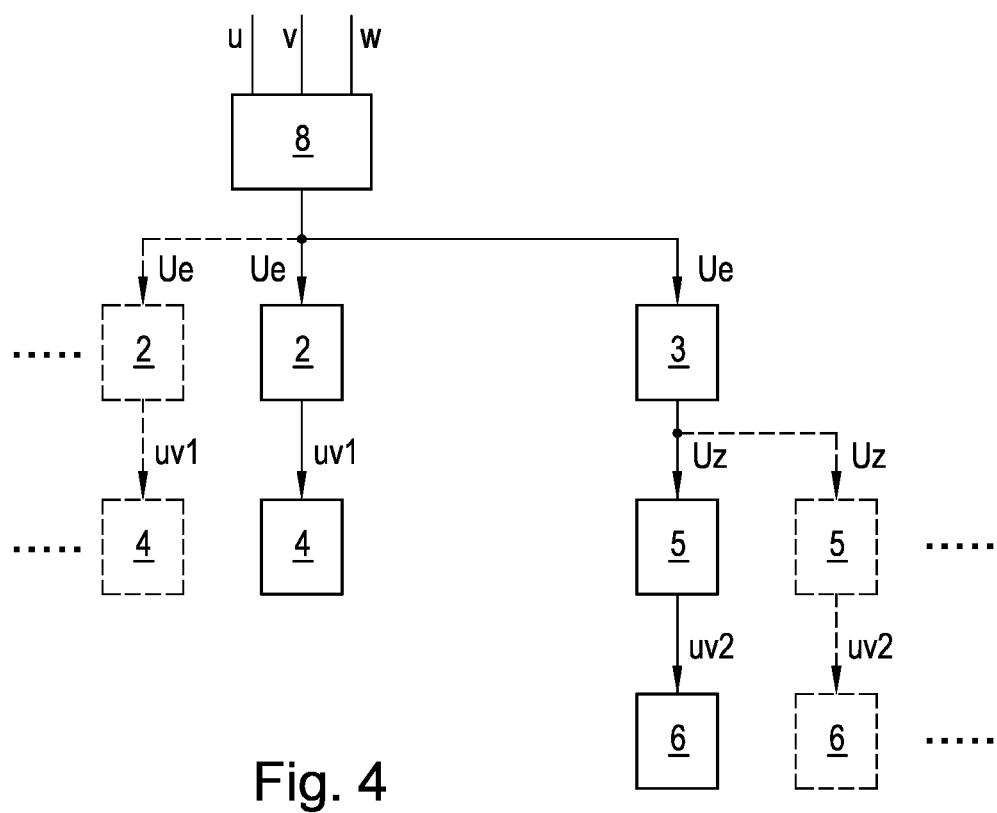
FIG. 4 shows a power supply system with multiple inverters and actuators.

The low DC voltage Ue can also be provided to multiple low voltage inverters 2 by the rectifier 8, the multiple low voltage inverters 2 each in turn supplying low voltage actuators 4 with low supply AC voltages uv1. The extra-low DC voltage Uz can likewise be provided to multiple extra-low voltage inverters 5 by the DC-DC converter 3, the multiple extra-low voltage inverters 5 each in turn supplying extra-low voltage actuators 6 with low supply AC voltages uv1. A power supply system 1 of this kind is shown schematically in FIG. 4.

The low voltage inverter 2 and/or the extra-low voltage inverter 5 are preferably designed to be bidirectional, and the rectifier 8 can also be designed to be bidirectional. However, the DC-DC converter 3 is particularly advantageously designed to be bidirectional and/or insulated. Excess power can thus be fed back from the extra-low voltage actuator 6 via the extra-low voltage inverter 5 and further via the DC-DC converter 3 to the power supply network. Excess power from the extra-low voltage actuator 6 can also be fed via the extra-low voltage inverter 5, the DC-DC converter 3, and further via the low voltage inverter 2 to the low voltage actuator 4. Of course, excess power can also be fed from the low voltage actuator 4 via the low voltage inverter 2, the DC-DC converter 3, and the extra-low voltage inverter 5 to the extra-low voltage actuator 4 or fed back from the low voltage actuator 4 via the low voltage inverter 2 and the rectifier 8 to the power supply network if the rectifier 8 is also designed to be bidirectional.

The DC-DC converter 3 preferably comprises an inverter unit 30 for converting the low input DC voltage into a primary voltage ue1 (and vice versa), a transformer unit 3 which is connected to the inverter unit 30 in order to transform the primary AC voltage ue1 into a secondary AC voltage ue2 (and vice versa), and a rectifier unit 32 which is connected to the transformer unit 31 in order to convert the secondary AC voltage ue2 into the extra-low DC voltage Uz (and vice versa).

Figure 5:
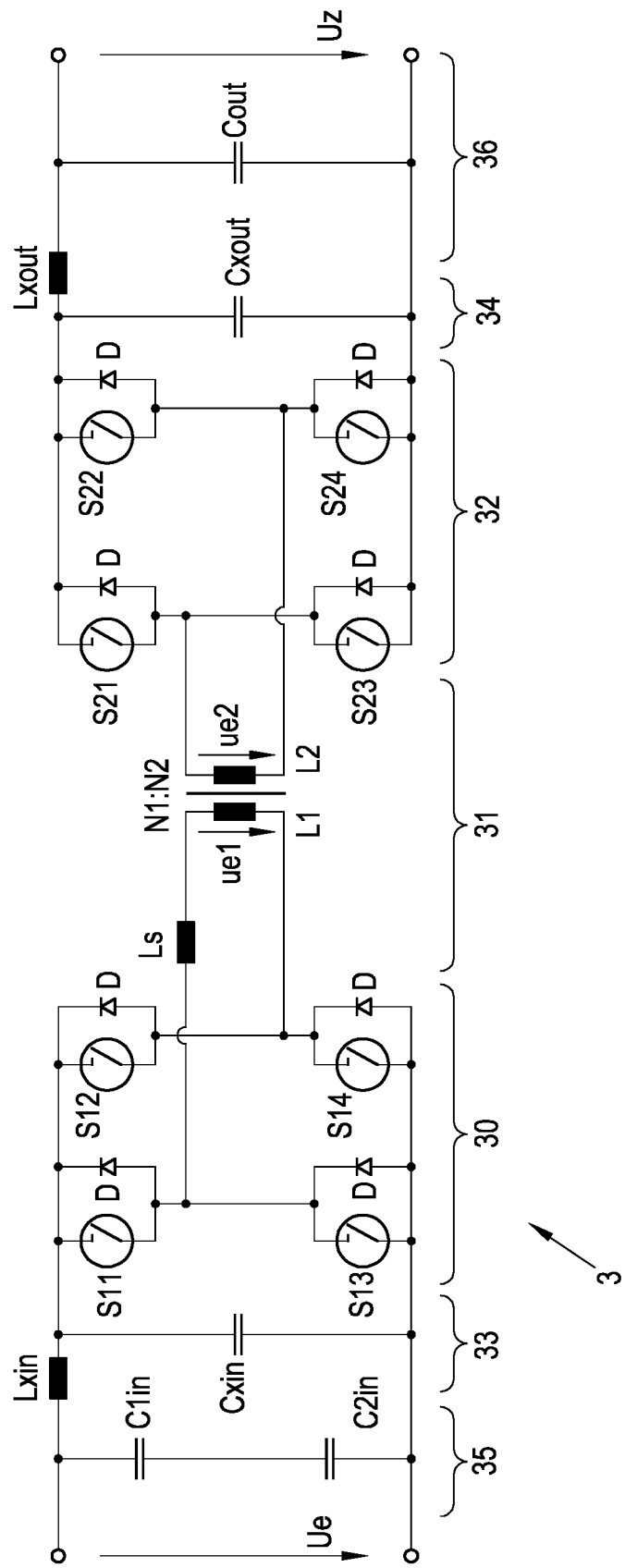
FIG. 5 shows a preferred embodiment of a DC-DC converter.

A particularly advantageous embodiment of the DC-DC converter 3 is shown in FIG. 5. The inverter unit 30 here is advantageously designed as a DC/AC voltage bridge and comprises a first primary-side bridge arm with a first primary-side power switch S11 and a third primary-side power switch S13 connected in series. The DC/AC voltage bridge further comprises a second primary-side bridge arm with a second primary-side power switch S12 and a fourth primary-side power switch S14 connected in series. The first primary-side bridge arm and the second primary-side bridge arm are each connected in parallel with the low input DC voltage Ue. A diode which is forward-biased with respect to the low input DC voltage Ue is connected in parallel with each of the primary-side power switches S11, S12, S13, S14. The primary-side power switches S11, S12, S13, S14 are controlled by a primary control unit (not shown) in such a way that the primary AC voltage ue1 between the connection point of the first primary-side power switch S11 and the third primary-side power switch S13 and the connection point of the second primary-side switch S12 and fourth primary side power switch S14 can be tapped.

The primary AC voltage u1 is applied to a primary winding L1 of the transformer unit 31. A leakage inductance Ls in series with the primary winding is also shown in FIG. 5. The transformer unit 31 transforms the primary AC voltage ue1 into a secondary AC voltage ue2 in accordance with the transformation ratio N1:N2.

Furthermore, the rectifier unit 32 is advantageously designed as an AC/DC voltage bridge. The AC/DC voltage bridge comprises a further first secondary bridge arm with a first secondary power switch S21 and a third secondary power switch S23 connected in series. The AC/DC voltage bridge additionally comprises a further, second secondary bridge arm which is connected in parallel with the first secondary bridge arm and has a second secondary power switch S22 and a fourth secondary power switch S24 connected in series. The secondary AC voltage ue2 of the transformer unit 31 is applied between the connection point of the first secondary power switch S21 and third secondary power switch S23 and the connection point of the second secondary power switch S22 and fourth secondary power switch S24. The secondary power switches S21, S22, S23, S24 are controlled by a secondary control unit (not shown) in such a way that the secondary AC voltage ue2 is converted into an extra-low DC voltage Uz parallel to the first and second secondary bridge arms. The primary control unit and secondary control unit can of course also be an integral component of a DC-DC converter control unit. A diode which is forward-biased with respect to the extra-low DC voltage Uz is connected in parallel with each of the secondary power switches S21, S22, S23, S24.

The DC-DC converter 3 shown is bidirectional, i.e. it is possible to convert the low input DC voltage Ue into the extra-low DC voltage Uz, and vice versa. Power can thus be transported from the output side of the DC-DC converter 3 to the input side, and vice versa. If the extra-low DC voltage Uz is converted into the low input DC voltage Ue, the rectifier unit 32 also functions as an inverter unit, i.e., in the embodiment shown, the AC/DC voltage bridge also functions as a DC/AC voltage bridge. The inverter unit 30 likewise functions as a rectifier unit, i.e., in the embodiment shown, the DC/AC voltage bridge also functions as an AC/DC voltage bridge.

The use of an insulated transformer unit 31 ensures that the input side of the DC-DC converter 3 is insulated from the output side of the DC-DC converter 3.

The DC-DC converter 3 also has optional input capacitors C1in, C2in, which are connected in parallel with the low input DC voltage Ue, and an optional output capacitor Cout, which is connected in parallel with the extra-low DC voltage Uz. An optional series input filter inductor Lxin is also provided, as well as an optional parallel input filter capacitor Cxin. An optional series output filter inductor Lxout and an optional parallel output filter capacitor Cxout are also shown.

In order to be usable for low input DC voltages Ue of up to 900V, the primary power switches S11, S12, S13, S14 can be used with a blocking capability of up to 1200V. In order to achieve high efficiency, silicon carbide is preferably used as the semiconductor material of the primary power switches S11, S12, S13, S14.

The invention claimed is:

1. A power supply system, comprising:
    a rectifier designed to convert a mains AC voltage into a low input DC voltage;
    a low voltage inverter connected to the rectifier and designed to convert the low input DC voltage into a low supply AC voltage;
    a low voltage actuator, the low voltage inverter being connected to the low voltage actuator in order to supply the low voltage actuator with power via the low supply AC voltage;
    a DC-DC converter that is connected to the rectifier and is designed to convert the low input DC voltage into an extra-low DC voltage;
    an extra-low voltage inverter that is connected to the DC-DC converter and is designed to convert the extra-low DC voltage into an extra-low supply AC voltage; and
    an extra-low voltage actuator connected to the extra-low voltage inverter,
    wherein the extra-low voltage inverter is connected to supply power via the extra-low supply AC voltage to the extra-low voltage actuator, and
    wherein the extra-low voltage inverter, the DC-DC converter and the low voltage inverter are designed to be bidirectional and are configured to transfer/feed-back excess power from the extra-low voltage actuator to the low voltage actuator or from the low voltage actuator to the extra-low actuator.

2. The power supply system according to claim 1, wherein the DC-DC converter is connected to the low voltage inverter via a supply connection in order to supply the low voltage inverter with operating power via the extra-low DC voltage.

3. The power supply system according to claim 1, wherein the DC-DC converter is an integral component of the rectifier.

4. The power supply system according to claim 1, wherein the DC-DC converter is designed to be insulated.

5. The power supply system according to claim 1, wherein the DC-DC converter comprises an inverter unit for converting the low input DC voltage into a primary voltage,
    wherein the DC-DC converter comprises a transformer unit which is connected to the inverter unit in order to transform the primary AC voltage into a secondary AC voltage, and
    wherein the DC-DC converter comprises a rectifier unit which is connected to the transformer unit in order to convert the secondary voltage into the extra-low DC voltage.

6. The power supply system according to claim 1, wherein the low voltage actuator is part of a kinematics system, a machine tool, or a rotary motor.

7. The power supply system according to claim 1, wherein the extra-low voltage actuator is part of a long-stator linear motor.

8. The power supply system according to claim 1, wherein the extra-low voltage actuator is part of a planar motor.

9. The power supply system according to claim 1, wherein the extra-low voltage actuator is part of a rotary extra-low voltage motor.

10. The power supply system according to claim 1, further comprising a plurality of extra-low voltage inverters, which includes the extra-low voltage inverter, with associated extra-low voltage actuators, which include the extra-low voltage actuator,
    wherein the plurality of extra-low voltage inverters are connected to the DC-DC converter in order to convert the extra-low input DC voltage into respective extra-low supply AC voltages and to supply each associated extra-low voltage actuator with the extra-low supply AC voltage.

11. The power supply system according to claim 1, further comprising a plurality of low voltage inverters, which includes the low voltage inverter, with associated low voltage actuators, which includes the low voltage actuator,
wherein the plurality of low voltage inverters are connected to the rectifier in order to convert the low input DC voltage into respective low supply AC voltages and to supply each associated low voltage actuator with the low supply AC voltage.

12. A method for supplying power to a low voltage actuator and an extra-low voltage actuator, comprising:
converting, via a rectifier, a mains AC voltage of a power supply network into a low input DC voltage and converting, via a low voltage inverter, the low input DC voltage into a low supply AC voltage, to supply the low voltage actuator with power via the low supply AC voltage;
converting, via a bidirectionally designed DC-DC converter, the low input DC voltage into an extra-low DC voltage, and
converting, via an extra-low voltage inverter, the extra-low DC voltage into an extra-low supply AC voltage to supply the extra-low voltage actuator with power via the extra-low supply AC voltage,
wherein at least one of the extra-low voltage inverter and the low voltage inverter are bidirectionally designed; and
the method further comprises one of:
feeding excess power from the extra-low voltage actuator via the extra-low voltage inverter, the bidirectionally designed DC-DC converter and the low voltage inverter to the low voltage actuator;
feeding excess power from the low voltage actuator via the low voltage inverter, the bidirectionally designed DC-DC converter and the extra-low voltage inverter to the extra-low voltage actuator;
feeding excess power from the extra-low voltage actuator via the extra-low inverter, the directionally designed DC-DC converter, the low voltage inverter and the rectifier to a power supply network; or
feeding excess power from the low voltage actuator via the low inverter, and the rectifier to a power supply network.

13. The method according to claim 12, wherein the excess power from the extra-low voltage actuator is fed via the extra-low voltage inverter, the bidirectional DC-DC converter, and the rectifier to the power supply network.

14. The method according to claim 12, wherein the excess power from the low voltage actuator is fed via the low voltage inverter, and the rectifier to a power supply network.

15. The method according to claim 12, wherein the excess power from the extra-low voltage actuator is fed via the extra-low voltage inverter, the bidirectionally designed DC-DC converter and the low voltage inverter to the low voltage actuator.

16. The method according to claim 12, wherein the excess power from the low voltage actuator is fed via the low voltage inverter, the bidirectionally designed DC-DC converter and the extra-low voltage inverter to the extra-low voltage actuator.

17. A power supply system, comprising:
a rectifier designed to convert a mains AC voltage into a low input DC voltage;
a low voltage inverter connected to the rectifier and designed to convert the low input DC voltage into a low supply AC voltage;
a low voltage actuator, the low voltage inverter being connected to the low voltage actuator in order to supply the low voltage actuator with power via the low supply AC voltage;
a DC-DC converter that is connected to the rectifier and is designed to convert the low input DC voltage into an extra-low DC voltage;
an extra-low voltage inverter that is connected to the DC-DC converter and is designed to convert the extra-low DC voltage into an extra-low supply AC voltage; and
an extra-low voltage actuator connected to the extra-low voltage inverter,
wherein the extra-low voltage inverter is connected to supply power via the extra-low supply AC voltage to the extra-low voltage actuator,
wherein the DC-DC converter is designed to be bidirectional and comprises:
an inverter unit for converting the low input DC voltage into a primary voltage,
a transformer unit which is connected to the inverter unit in order to transform the primary AC voltage into a secondary AC voltage, and
a rectifier unit which is connected to the transformer unit in order to convert the secondary voltage into the extra-low DC voltage.

* * * * *